(12) United States Patent
Wang et al.

(10) Patent No.: US 7,418,144 B2
(45) Date of Patent: Aug. 26, 2008

(54) CURVED WAVELET TRANSFORM FOR IMAGE AND VIDEO COMPRESSION

(75) Inventors: Demin Wang, Ottawa (CA); Liang Zhang, Ottawa (CA); Andre Vincent, Gatineau (CA)

(73) Assignee: Her Majesty the Queen in right of Canada, as represented by the Minister of Industry, Through the Communications Research Centre Canada, Ottawa (CA)

( * ) Notice: Subject to any disclaimer, the term of this patent is extended or adjusted under 35 U.S.C. 154(b) by 660 days.

(21) Appl. No.: 11/068,160

(22) Filed: Mar. 1, 2005

(65) Prior Publication Data

US 2005/0196060 A1 Sep. 8, 2005

Related U.S. Application Data

(60) Provisional application No. 60/549,142, filed on Mar. 3, 2004.

(51) Int. Cl.
*G06K 9/36* (2006.01)
*G06K 9/46* (2006.01)

(52) U.S. Cl. ............... 382/240; 382/232; 382/233; 382/238; 382/251; 375/240.19

(58) Field of Classification Search ......... 382/232–233, 382/236, 238, 239, 242–251, 253; 375/240.19
See application file for complete search history.

(56) References Cited

U.S. PATENT DOCUMENTS

| | | | |
|---|---|---|---|
| 5,014,134 A | 5/1991 | Lawton et al. |
| 5,048,111 A | 9/1991 | Jones et al. |
| 5,315,670 A | 5/1994 | Shapiro |
| 5,600,373 A | 2/1997 | Chui et al. |
| 5,764,807 A | 6/1998 | Pearlman et al. |
| 5,790,269 A | 8/1998 | Masaki et al. |
| 5,799,100 A | 8/1998 | Clarke et al. |
| 5,898,798 A | 4/1999 | Boulchard et al. |
| 5,915,046 A | 6/1999 | Echigo et al. |
| 6,101,284 A | 8/2000 | Matsubara et al. |
| 6,141,452 A | 10/2000 | Murao |
| 6,233,357 B1 | 5/2001 | Li et al. |
| 6,233,358 B1 | 5/2001 | Acharya |

(Continued)

OTHER PUBLICATIONS

"Subband Coding of Images", Woods et al, IEEE Trans. Acoustics, Speech Signal Processing, vol. ASS p. 34, No. 5, pp. 1278-1288, 1986.

(Continued)

*Primary Examiner*—Matthew C. Bella
*Assistant Examiner*—Ali Bayat
(74) *Attorney, Agent, or Firm*—Teitelbaum & MacLean; Neil Teitelbaum; Doug MacLean

(57) ABSTRACT

A curved wavelet transform and a related image/video compression system are disclosed. The curved wavelet transform (CWT) is carried out by applying one-dimensional (1-D) wavelet filters along curves, rather than along only horizontal and vertical directions. The image/video compression system includes a curve determination unit, a curved wavelet transform unit, a wavelet coefficient quantization unit, a wavelet coefficient coding unit, and a curve coding unit. The quantization and coding of the wavelet coefficients are related to the curves. In one embodiment, recursive wavelet filters are used for inverse wavelet decomposition. The system provides higher compression capability than conventional wavelet-based image compression systems.

21 Claims, 15 Drawing Sheets

U.S. PATENT DOCUMENTS

| | | | |
|---|---|---|---|
| 6,343,155 | B1 | 1/2002 | Chui et al. |
| 6,549,674 | B1 | 4/2003 | Chui et al. |
| 6,836,569 | B2 | 12/2004 | Le Pennec et al. |
| 2002/0057844 | A1* | 5/2002 | Sirohey et al. .............. 382/240 |
| 2003/0002582 | A1* | 1/2003 | Obrador ................ 375/240.11 |
| 2003/0031369 | A1* | 2/2003 | Le Pennec et al. .......... 382/232 |

OTHER PUBLICATIONS

"Efficient Signal Extension for Subband/wavelet Decomposition of Arbitrary Length Signals", Barnard et al, SPIE, vol. 2096, Visual Comm. And Image Processing, pp. 996-975, 1993.

"Image Compression Fundamentals, Standards and Practice", Taubman et al, JPEG 2000, Kluwer Academic Publishers, Boston, 2002.

"Sketch Based Coding of Grey Level Images", Carlsson, IEEE Transaction on Signal Processing, vol. 15, pp. 57-83, Jul. 1988.

"A Theory for Multiresolution Signal Decomposition, The Wavelet Representation", IEEE Trans. Pattern Anal. Machine Intell. vol. 11, pp. 674-693, Jul. 1989.

"Image Coding Using Wavelet Transform", Antonini et al , IEEE Trans. Image Processing, vol. 1, pp. 205-220, Apr. 1992.

"The JPEG2000 Still Image Coding System: An Overview", Christopoulos, IEEE Trans. Consumer Electronics, vol. 46, No. 4, pp. 1103-1127, Nov. 2000.

"Curved Wavelet Transform for Scalable Video Coding", Wang et al, ISO/IEC, JTC1/SC29/WG11, MPEG2004/m10535, Munich, Germany, Mar. 2004.

"Curved Wavelet Transform and Overlapped Extension for Image Coding", Wang et al, Proceedings of International Conf. On Image Processing 2004, pp. 1273-1276, Singapore, Oct. 24-27, 2004.

"Bandelet Image Approximation and Compression" preprint, Le Pennec et al, Nov. 2004.

"Curvelets: A Surprisingly Effective Nonadaptive Representation of Objects with Edges", Candes et al, Tech. Rep., Stanford Univ. 1999.

"Image Compression via Edge-Based Wavelet Transform", Mertins, Opt. Eng., vol. 38, No. 6, pp. 991-1000, 1999.

"Characterization of Signals form Multiscale Edges", Mallat et al, IEEE Trans. Pattern Anal. Machine Intell., vol. 14, pp. 710-732, Jul. 1992.

"Adaptive SPIHT for Image Coding Based on Curved Wavelet Transform", Zhang et al, Proceedings of SPIE vol. 5685, Image and Video Comm. And Processing, 2005.

Partial European Search Report, European Application No. 05101645.9, Feb. 11, 2008.

"Curved Wavelet Transform and Overlapped Extension for Image Coding", Demin Wang et al, Image Processing, 2004, ICIP 2004, 2004 International Conference on Singapore Oct. 24-27, 2004, Piscataway, NJ, USA, IEEE, Oct. 24, 2004, pp. 1273-1276.

"Three-Dimensional Embedded Subband Coding With Optimized Truncation (3-D ESCOT)", Jizheng Xu et al, Applied and Computational Harmonic Analysis Academic Press USA, vol. 10, No. 3, May 2001, pp. 290-315.

"Geometrical Image Compression With Bandelets", E Le Pennec et al, Proceedings of the SPIE—The international Society for Optical Engineering SPIE-Int. Soc. Opt. Eng USA, vol. 5150, No. 1, 2003, pp. 1273-1286.

"Discrete Multi-Directional Wavelet Bases", V Velisavljevic et al, Proceedings 2003 International Conference on Image Processing, ICIP-200, Barcelona, Spain, Sep. 14-17, 2003, International Conference on Image Processing, New York, NY: IEEE, US, vol. 2 of 3.

"Efficient Signal Extension for Subband/Wavelet Decomposition of Arbitrary Length Signals", H J Barnhard et al, Proceedings of the SPIE, SPIE, Bellingham, VA, US, vol. 2094, Nov. 1993, pp. 966-975.

* cited by examiner

A symmetric FIR filter of length 5: $F(i) = \sum_{k=-2}^{2} h(k) f(i-k)$

| Orientations of $(x_i, y_i)$ or $(x_i, z_i)$ | $(0, \pi/2)$ | $(\pi/4, \pi/2)$ | $(-\pi/4, \pi/2)$ | $(0, 3\pi/8)$ | $(0, 5\pi/8)$ |
|---|---|---|---|---|---|
| | → ↓ | ↘ ↓ | ↗ ↓ | → ↘ | → ↙ |
| Pattern of children's positions | 420 | 421 | 422 | 423 | 424 |

FIG. 13

CURVED WAVELET TRANSFORM FOR IMAGE AND VIDEO COMPRESSION

CROSS-REFERENCE TO RELATED APPLICATIONS

This application claims priority of U.S. Provisional Patent Application No. 60/549,142 filed Mar. 3, 2004, entitled "Methods for Wavelet Transform and Systems for Image and Video Compression", which is incorporated herein by reference for all purposes.

FIELD OF THE INVENTION

The present invention relates to data processing and more specifically to a method and system for transformation of multi-dimensional images using curved wavelet transforms and recursive wavelet filters for image and video data compression and restoration.

BACKGROUND OF THE INVENTION

Without compression, the transmission of images and video requires an unacceptable bandwidth in many applications. As a result, methods of compressing images and video have been the subject of numerous research publications. Image and video compression schemes convert an image consisting of an array of pixels into a sequence of bits. Compression involves transforming the image to a form that can be represented in fewer bits without losing the essential features of the original image. The transformed image is then transmitted over a communication link and the inverse transformation is applied at the receiver to recover the image or a reasonable facsimile thereof.

Wavelet transform has become a powerful tool for signal processing and image compression. A number of image and video compression systems based on wavelet transform and zero-tree coding schemes have been developed.

In existing image and video compression systems and standards, including the image coding standard JPEG2000 described for example in D. S. Taubman and M. W. Marcellin, "JPEG2000: Image Compression Fundamentals, Standards and Practice", Kluwer Academic Publishers, Boston, 2002, page 423 to 430, two-dimensional (2-D) wavelet transform of an image is always carried out by one-dimensional (1-D) wavelet filtering along horizontal and vertical directions, if the filters are separable. This conventional wavelet transform, shown in FIG. 1, was described by J. W. Woods et al., in an article "Subband coding of images," IEEE Trans. Acoustics, Speech, Signal Processing, Vol. ASSP-34, No. 5, pp. 1278-1288, 1986, and by S. G. Mallat in an article "A theory for multiresolution signal decomposition: The wavelet representation," IEEE Trans. Pattern Anal. Machine Intell., Vol. 11, pp. 674-693, July 1989, which are incorporated herein by reference.

FIG. 1 schematically shows main steps of this prior-art multi-resolution wavelet transform method at a single resolution level, the steps forming a pyramid or a tree-like structure. First, an input image 100 is transformed in horizontal direction by applying a low-pass wavelet filter in step 101 and a high-pass wavelet filter in a parallel step 102 along rows of the image, producing two images filtered in horizontal directions. Next, in steps 111 and 112 the two horizontally filtered images are sub-sampled by discarding, respectively, odd and even columns therefrom, resulting in low-pass (L) and high-pass (H) wavelet coefficients images. In a next set of parallel steps 122-125, the low-pass and high-pass filters are applied in the vertical direction along the columns of each of the L and H wavelet coefficients images producing four filtered images. These four filtered images are down sampled in steps 132-135 in vertical direction by discarding e.g. odd rows in vertically high-pass filtered images, and even rows in vertically low-pass filtered images, producing finally four sub-band images respectively composed of LL, LH, HL and HH coefficients. The process repeats for the LL sub-band image as an input image with wavelet filters at a next resolution level. The method is thus recursive and produces a hierarchical sequence of down-sampled low-pass and high-pass filtered images at successively decreasing resolution levels.

A number of methods have been proposed to code the wavelet coefficients resulting from the multi-level wavelet transform. The most important methods include an embedded zero-tree structure (EZW) method disclosed by Shapiro in U.S. Pat. No. 5,315,670, and a set partitioning in hierarchical trees (SPIHT) disclosed by Pearlman et al. in U.S. Pat. No. 5,764,807. These zero-tree structures employ a parent-child relationship between a coefficient at one level of the wavelet transform and four coefficients within a 2×2 square at the next lower level.

Prior-art wavelet filters used in the wavelet transform are typically finite impulse response (FIR) filters that are implemented with a non-recursive convolution structure, or with a lifting structure. FIG. 2 shows a prior-art convolution structure of a symmetric FIR filter with a length of 5. When a FIR filter is applied to a row, a column of an image, or along a motion trajectory within a video sequence, the sequence of pixels, i.e. image samples, along the row, the column, or the motion trajectory has to be extended in order to result in an output sequence of the same length. FIG. 3 illustrates a popularly used prior-art method of symmetric extension, which is often considered to be the best approach in the literature to date. If the extension is done by repeating the first and last samples of the sequence, the sequence cannot be perfectly reconstructed from the resulting wavelet coefficients using conventional convolutional FIR filters, as shown for example in an article by H. J. Barnard et al., "Efficient signal extension for subband/wavelet decomposition of arbitrary length signals," SPIE Vol. 2096, Visual Communications and Image Processing, 1993, pp. 966-975.

These prior art methods of wavelet transform and systems of image and video compression have the following shortcomings. When an image is filtered in horizontal and vertical directions, the filter often crosses edges in the image, i.e. elongated geometrical structures in the image across which an image value drastically changes. A sequence of pixels across an edge usually contains a broad frequency spectrum, from low to high frequencies. The wavelet transform decomposes the energy of the pixel sequence to a large number of frequency bands, also referred to as scales. This means that many wavelet coefficients at many resolution levels are required to properly reconstruct the edge. Therefore, the conventional wavelet transform, which is not adapted to an image, does not provide a compact representation of edges. As a result, the prior art wavelet-based image and video compression systems produce "ringing" artifacts around edges, especially at low bit rates.

The main limitation of wavelet filtering schemes currently used for signal representation is that they do not take advantage of the geometrical regularity of many signal structures. Indeed, these wavelet filters are composed of vectors having a support which is not adapted to the elongation of the signal structures such as regular edges. Curvelet bases have recently been introduced in E. Candes and D. Donoho, "Curvelets: A surprisingly effective nonadaptive representation of objects with edges," tech. rep., Stanford Univ., 1999, the contents of which are incorporated in reference herein, to take partial advantage of the geometrical regularity of the signal, by using elongated support zones along different directions. Yet, this strategy has not been able to improve results currently obtained with a wavelet basis on natural images, because it does not incorporate explicitly the geometrical information.

To incorporate this geometrical regularity, edge oriented representations have been developed in image processing. An edge detector computes an edge map with discretized differential operators and computes some coefficients in order to reconstruct an approximation of the image grey level between edges. In S. Carlsson, "Sketch based coding of gray level images," Signal Processing, Vol. 15, pp. 57-83, July 1988, the contents of which are incorporated by reference herein, an edge detector computes an edge map with discretized derivative operators. For compression applications, chain algorithms are used to represent the chains of edge points with as few bits as possible. The left and right pixel values along the edges are kept and an image is reconstructed from these left and right values with a diffusion process. If all edges were step edges with no noise, this representation would be appropriate but it is rarely the case, and as a result the reconstructed image is not sufficiently close to the original image. An error image is computed and coded with a Laplacian pyramid, but this requires too many bits to be competitive with a procedure such as JPEG-2000.

A different strategy is used by several other methods, which encode coefficients that represent the image variations in regions between edges as opposed to the image variations across edges. In I. Masaki, U. Desai, A. Chandrakasan, and B. Horn, "Method and apparatus for compressing and decompressing a video image" U.S. Pat. No. 5,790,269, instead of keeping the image grey levels at the left and right of an edge point, the parameters of a linear regression are kept to approximate the image grey levels along horizontal and vertical lines between two edge points. A similar strategy is used in T. Echigo, J. Maeda, J.-K. Hong, and M. Ioka, "System for and method of processing digital images," U.S. Pat. No. 5,915,046, where each region is coded using a polygonal surface approximation. In the two above referenced methods, the coefficients are more global and thus less sensitive to noise but edges are still represented by a discontinuity between two regions.

In A. Mertins, "Image compression via edge-based wavelet transform," Opt. Eng., Vol.38, No. 6, pp. 991-1000, 1999, the grey level image values are decomposed in a one-dimensional discrete wavelet basis along horizontal or vertical lines between two edge points. In L. Bouchard and R. Askenatis, "Region-based texture coding and decoding method and corresponding system." U.S. Pat. No. 5,898,798, the image is segmented into regions, which are coded independently using a quincunx wavelet transform. In the two above referenced wavelet methods, the whole image information is represented but these procedures do not use the geometrical image regularity to decorrelate the coefficients produced by the image variations on each side of the edges.

U.S. Pat. No. 6,836,569 issued to Le Pennec and Mallat, discloses a processing method and system for n-dimensional signals such as images, wherein foveal filtering and bandelet transforms are used to transform an image taking into account geometrical features therein such as edges. First, foveal processing of the image data is performed to compute foveal coefficients along a set of curved trajectories in the image by using foveal filters with a support across trajectories and along coordinates in the image. A second transform is then performed using bandelet filters, or two-dimensional anisotropic wavelets that are warped along a geometric flow in the image. This method takes advantage of image content such as regular elongated geometrical structures therein, or edges, but required rather complicated processing using two-dimensional bandelet filters with additional foveal pre-processing.

Further, the prior-art wavelet transform methods of image processing using non-recursive FIR filters require a large memory. Memory size may be critical for temporal wavelet transform and for certain applications such as digital cameras, see e.g. U.S. Pat. No. 6,343,155. The symmetric extension, although it is often considered heretofore in the literature to be the best extension method, introduces additional distortion into decoded images. As described by C. Christopoulos, A. Skodras, and T. Ebrahimi, in an article "The JPEG2000 still image coding system: An overview," IEEE Trans. Consumer Electronics, Vol. 46, No. 4, pp. 1103-1127, November 2000, when an image is divided into tiles and each tile is compressed independently using JPEG2000, this additional distortion can be observed as block artifacts around the boundary of every tile in the decoded image.

Accordingly, it is an object of the present invention to provide a sufficiently simple method of image transformation based on curved wavelet transform that is adaptive to edges and other regular elongated geometrical structures in the image and yields a compact and accurate representation thereof.

It is another object of the invention to provide an image and video data compression system based on multi-level curved wavelet transform that provides a high compression capability.

It is another object of the present invention to provide a method of recursive wavelet filtering and an image compression system employing thereof that requires a small memory and that is easy to implement in hardware.

SUMMARY OF THE INVENTION

In accordance with the invention, a method of image transformation is provided comprising transforming an n-dimensional image, the n-dimensional image representable by an n-dimensional pixel array wherein $n \geq 2$, into a wavelet-transformed image comprised of wavelet coefficients by performing one-dimensional wavelet transforms along a plurality of curved paths dependent upon content of the image, wherein the content of the image includes at least one of: contours within the image, edges within the image, luminance, texture, and color; and wherein the wavelet transformations are performed using wavelet filters having support along the plurality of curved paths, and wherein substantially each pixel is associated with a curved path from the plurality of the curved paths.

In accordance with another aspect of this invention, the method of image transformation herein provided comprises decomposing the image into a hierarchical sequence of down-sampled low-pass and high-pass filtered images comprised of wavelet coefficients computed recursively by performing wavelet transforms along pluralities of curved paths at successively decreasing resolution levels.

In accordance with another aspect of the invention, a system of image encoding is provided for encoding and compressing images into encoded image data, the image represented using an array of pixels, the image encoding system comprising: a curve determination unit for determining a plurality of curved paths in an image wherein substantially each pixel is associated with a curved path from the plurality of curved paths; a curved wavelet transform unit for performing wavelet transforms of the image values along the plurality of curved paths and for outputting wavelet transformed images represented by wavelet coefficients; a curve coding unit; a wavelet coefficient quantization unit for performing curved path adaptive quantization of the wavelet coefficients; and, a wavelet coefficient coding unit for performing curved path adaptive coding of the wavelet coefficients.

In accordance with another aspect of the invention, a system of image decoding is provided for decoding and restoration of an image encoded by a system employing 1-D wavelet transform along a plurality of curved paths, the image decoding system comprising: a curve decoding unit for decoding information defining the curved paths; a wavelet coefficient decoding unit responsive to the decoded information defining the curved paths for adaptively decoding wavelet coefficients for the image; a wavelet coefficient de-quantization unit for de-quantization of the decoded wavelet coefficients of the image; and, an inverse curved wavelet transform unit for performing inverse wavelet transformations for restoring image values along the curved paths in the image.

In accordance with another aspect of the invention, a method of decompressing an n-dimensional image is provided comprising: receiving image data compressed by a method including the step of transforming the n-dimensional image by multi-level wavelet filtering along curved paths extended by repeating end-point image samples, decoding the image data to obtain sequences of wavelet coefficients along the curved paths, and performing multi-level inverse wavelet transform along the curved paths using recursive wavelet filters.

BRIEF DESCRIPTION OF THE DRAWINGS

Exemplary embodiments of the invention will now be described in conjunction with the drawings in which:

FIG. 13 is a table of patterns of the children's positions for five combinations of curve orientations according to the present invention.

DETAILED DESCRIPTION

The present invention provides a method of curved wavelet transform (CWT) adaptive to image content, and systems of image and video data compression and decompression using the method. The present invention provides also a recursive wavelet filter and a CWT-based image/video compression system using the recursive wavelet filters. The curved wavelet transform is carried out by applying one-dimensional (1-D) filters along curved paths in an image, also hereinafter referred to as curves, rather than along only straight lines parallel to coordinate axes in the image, thereby providing a more compact representation of lines and edges in the image. The curved paths are determined adaptively to image content, which may include contours within the image, edges within the image, luminance, texture, and color. The recursive filters are derived from known, prior-art non-recursive wavelet filters. The wavelet transform using recursive filters require less memory and can also improve image/video quality.

For sake of clarity, the method and systems of the present invention are described hereinbelow with exemplary embodiments wherein all images are two-dimensional, and are represented by 2-D arrays of pixels arranged in rows and columns, and wherein each pixel has a value also referred to as image value at a particular location. The images can be a picture of any kind, a frame of a video, or a residual image obtained from motion compensation of a video.

Those skilled in the art would appreciate however that the method of present invention, with a straightforward generalization, is applicable to any n-dimensional signals comprising regular geometrical structures such as edges. For example, the method is applicable to video signals wherein time provides a third dimension and which therefore can be considered as 3-D images. Hereinafter in this specification n-dimensional signals, $n \geq 2$, i.e. signals comprised of symbols organized in an n-dimensional space in an ordered manner, will be referred to as n-dimensional images.

DESCRIPTION OF THE PREFERRED EMBODIMENTS

Figure 4:
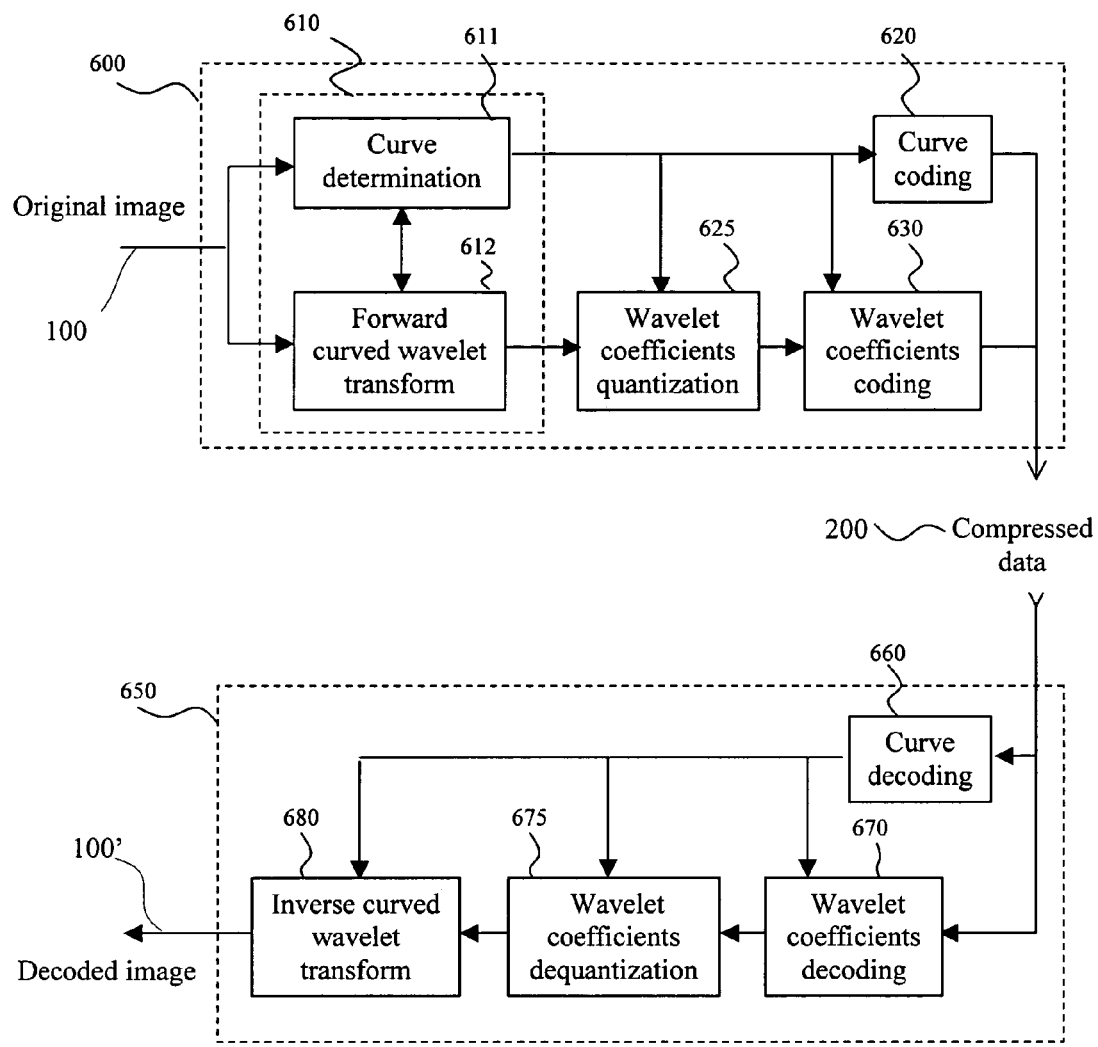
FIG. 4 is a block diagram of an image compression system using the curved wavelet transform according to the present invention.

A preferred embodiment of an image transformation system using curved wavelet transform (CWT) according to the present invention is shown in FIG. 4 and is hereinafter described.

The system is formed by an image compression apparatus 600 and an image decompression apparatus 650. The image compression apparatus receives an input, or original image 100, and outputs a compressed data sequence 200. The image compression apparatus 600 includes a curve determination unit 611, a forward CWT unit 612, a curve coding unit 620, a wavelet coefficient quantization unit 625, and a wavelet coefficient coding unit 630. The curve determination unit 611 adaptively determines a plurality of curves in an original, or input image 100, which are generally oriented parallel to edges and lines present in the input image 100 that is to be transformed. The CWT is carried out by applying 1-D wavelet filters along the plurality of curves, rather than along only horizontal and vertical straight lines. Herein in this specification, applying a wavelet filter along a curve means that a support of the wavelet filter coincides with a portion of the curve, and a sequence of image values, or pixels, along the portion of the curve form an input to the wavelet filter. Since a sequence of pixels along a curve that is parallel to lines and edges typically consists mostly of low frequency components, it can be well represented using a smaller number of wavelet coefficients. Therefore, the CWT method of the present invention, which is described in detail hereinbelow, provides a simple and efficient scheme that yields a compact representation of images, improving image and video compression efficiency. The quantization and coding of the wavelet coefficients performed by units 625 and 630 can be performed adaptively to the curves.

The decompression apparatus 650 receives the compressed data sequence 200 and outputs a decoded image 100' approximating the input image 100. The decompression apparatus 650 includes a curve decoding unit 660, which decodes the curves for each resolution level of the CWT, and provides the information to a wavelet coefficients decoding unit 670, a wavelet coefficients de-quantization unit 675, and an inverse CWT unit 680. The inverse CWT unit 680 reconstructs the image 100 by applying inverse wavelet filters along the curves.

Figure 1:
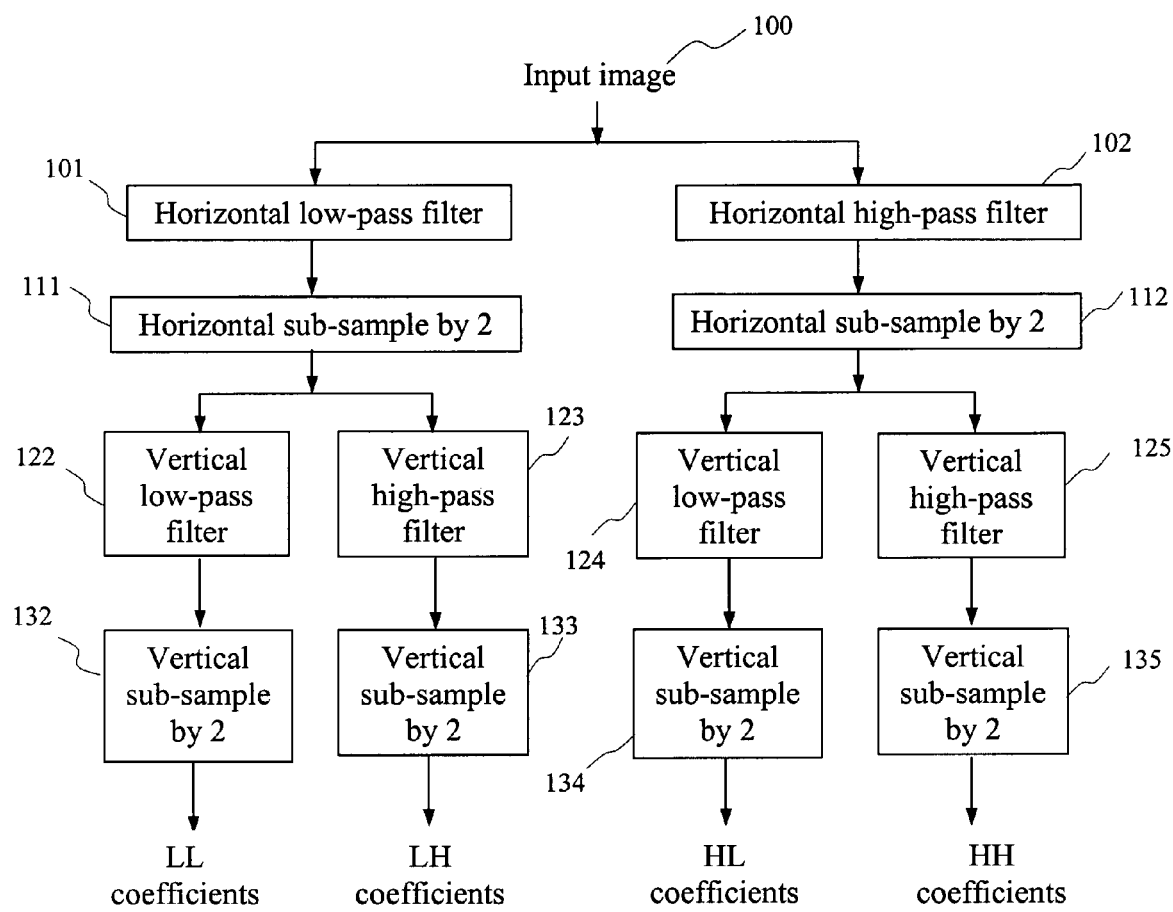
FIG. 1 is a block diagram of a prior art wavelet image transform method at a single resolution level.

Prior art wavelet-based image compression systems schematically shown in FIG. 1 use the conventional wavelet transform, which is carried out through filtering in the horizontal and vertical directions. These prior-art systems do not therefore require the units of curve determination, curve coding, and curve decoding. The quantization and coding of wavelet coefficients in the prior art systems performed independently on curves in the image and are therefore not adaptive to image content.

Functioning of the units comprising the system of the present invention shown in FIG. 4 will be now described in detail in conjunction with a detailed description of the method of image transformation by the curved wavelet transform.

Curved Wavelet Transform

According to the present invention, the method of curved wavelet transform is used for multi-level image decomposition in place of the conventional wavelet transform along rows and columns of an image. Advantageously, the CWT can be performed jointly with the curve determination, as will be described herein below. In FIG. 4, the curve determination unit 611 and the forward CWT unit 612 together form a common processing block 610.

Figure 5:
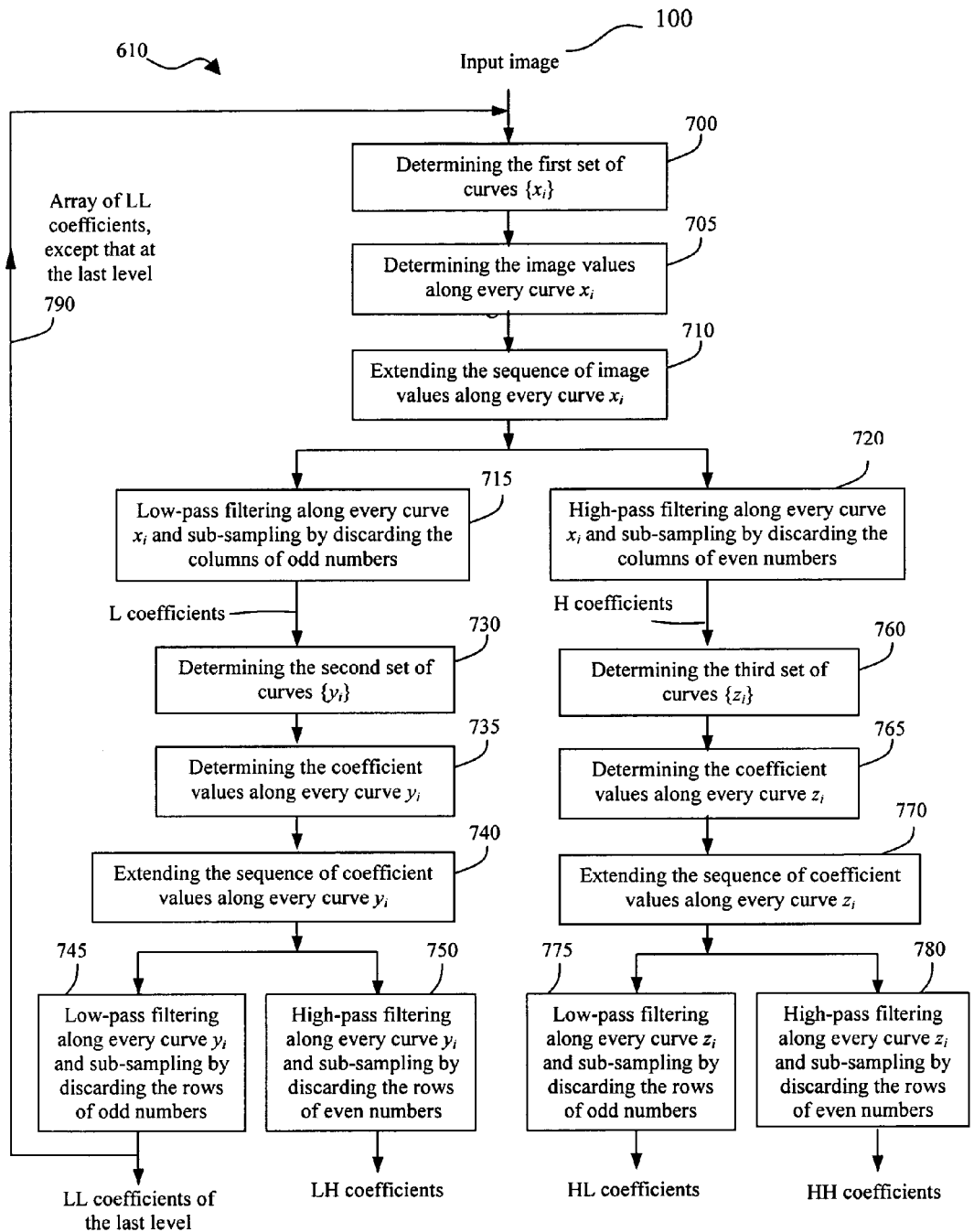
FIG. 5 is a block diagram of the forward curved wavelet transform method of 2-D image transformation at one resolution level according to an embodiment of the present invention.

FIG. 5 shows a block diagram of a preferred embodiment of the processing block 610 performing the functions of the curve determination unit 611 and the forward CWT unit 612 according to the present invention. Functioning of this block will now be described by describing in general terms the CWT method steps, which the processing block 610 implements according to the present invention.

First, the input image 100, which is to be compressed, is sent to a processing unit 700 wherein a first set of curves $\{x_i\}$ is determined based on the image 100. The curves are generally oriented parallel to the edges and lines in the image, and every pixel of the image 100 is associated with at least one of the curves. Next, a processing unit 705 determines image values along every curve $x_i$, and sequences of the image values along every curve $x_i$ are extended by the processing unit 710. Then, the image processing splits into two branches wherein each sequence of image values along every curve $x_i$ is filtered by a low-pass and a high-pass wavelet filter by processing units 715 and 720, respectively. The output of the low-pass filter is sub-sampled by discarding the columns of odd numbers, resulting in a down-sampled sub-image comprised of wavelet coefficients hereinafter referred to as L coefficients; whereas that of the high-pass filter is sub-sampled by discarding the columns of even numbers, resulting in a down-sampled sub-image comprised of wavelet coefficients hereinafter referred to as H coefficients. After that, the processing continues along two parallel branches. In one branch, a second set of curves $\{y_i\}$ based on the L coefficients is determined by a processing unit 730. Coefficient values along every curve $y_i$ are then determined by a processing unit 735, and sequences of coefficient values along every curve $y_i$ are extended by a processing unit 740. Finally, the sequence of coefficient values along every curve $y_i$ is low-pass and high-pass filtered by processing units 745 and 750. An output of the low-pass filter is sub-sampled by discarding rows of odd numbers, resulting in a down-sampled image comprised of LL coefficients of the first level; whereas an output of the high-pass filter is sub-sampled by discarding rows of even numbers, resulting in a down-sampled image comprised of LH coefficients of the first resolution level. In a similar way, the other branch includes processing units 760-780 wherein a third set of curves $\{z_i\}$ based on the H coefficients is determined and then the H coefficients are decomposed into HL coefficients and HH coefficients of the first resolution level.

The process of CWT-based image decomposition described hereinabove is a first level of a multi-level image decomposition. An array of the resulting LL coefficients is then considered as an image and is further decomposed using the same process, as illustrated by an arrow 790. This recursive decomposition repeats k times. Finally, the LH, HL, and HH coefficients resulting from all levels of the recursive decomposition and the LL coefficients from the last level are sent to the wavelet coefficients quantization unit 625 and the wavelet coefficients coding unit 630. The curves determined at all levels are sent to the curve coding unit 620 shown in FIG. 4.

This general procedure of multi-level image decomposition, apart from the curved wavelet transform, is known in the art also as image decomposition by dyadic wavelet transforms, and is described for example in "Characterization of signals from multiscale edges", IEEE Trans. Pattern Anal. Machine Intell., Vol. 14, pp. 710-732, July 1992 by S. Mallat et al., which his incorporated herein by reference. Including the CWT, according to the present invention, in this multi-level image processing makes the processing adaptive to the content of the image, thereby enabling more efficient image compression.

Certain constraints are, however, imposed on the curves so that the CWT produces a dyadic decomposition of images. Every curve $x_i$ in the first set must be a single valued function of, for example, a horizontal coordinate n in the image, $x_i(n)$. This means that the curve crosses a column of the image only once, if it does. The curve can be of any length, but must be continuous without gaps. Such a curve is called a horizontal curve in the context of the description herein. Image values along the curve come from a set of successive columns of the image, each value coming from a different column. Every pixel in the image to be filtered, or in a corresponding array of coefficients, must be passed by one horizontal curve. Similarly, every curve from the second and third sets must be a continuous, single valued function of the vertical coordinate m, $y_i(m)$ or $z_i(m)$, and are therefore referred herein as vertical curves. Every L coefficient must be passed by a curve of the second set and every H coefficient must be passed by a curve of the third set. The coefficient values along a vertical curve come from a set of successive rows of the image, each value coming from a different row.

Figure 6A:
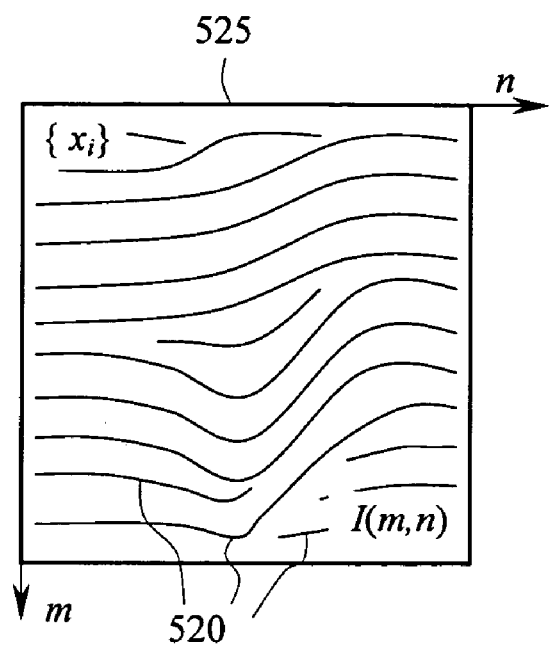
FIG. 6a is a diagram showing a first set of curves determined in an input image according to the present invention.
Figure 6B:
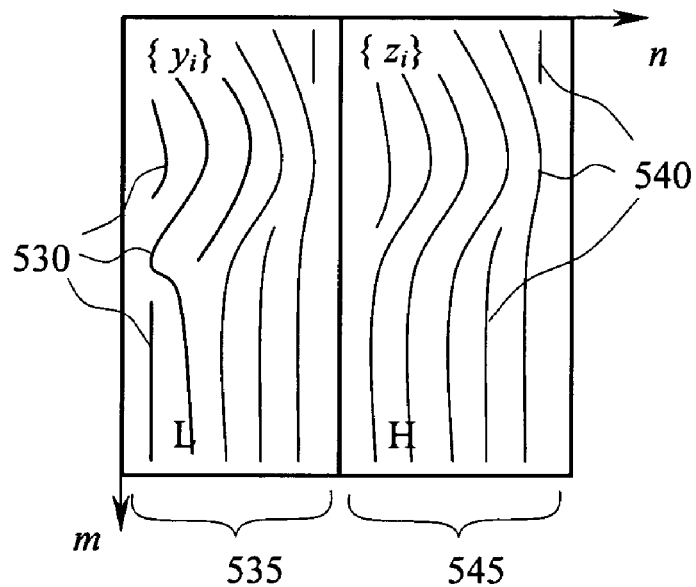
FIG. 6b is a diagram showing low-pass and high-pass images filtered along the first set of curves, and a second and third sets of curves determined therein in accordance with the present invention.

By way of example and with reference to FIG. 6, curves 520 in an input image 525 belong to the set of horizontal curves $\{x_i\}$, and are contiguous single-valued functions of the horizontal coordinate n. Curves 530 in a down-sampled array of low-pass wavelet coefficients 535 belong to the second set $\{y_i\}$ of vertical curves, and are continuous, single valued functions of the vertical coordinate m. Similarly, curves 540 in a down-sampled array of high-pass wavelet coefficients 545 belong to the third set $\{z_i\}$ of vertical curves, and are continuous, single valued functions of the vertical coordinate m.

Figure 7:
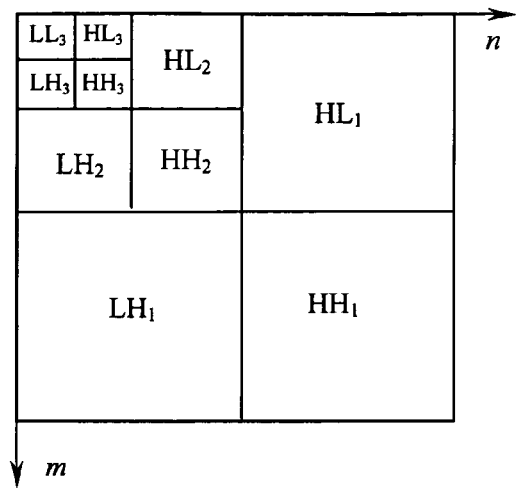
FIG. 7 is a diagram showing the decomposition of a 3-level curved wavelet transform according to the present invention.

Under these constraints, a multi-level CWT results in a dyadic decomposition of the image. FIG. 7 illustrates a resulting decomposition from a 3-level CWT under these constraints, which is typical for dyadic image decomposition.

Determination of Curves

Many methods of edge detection are known and can be used to determine the sets of curved paths in the CWT method of the present invention. For a given input image and a target bit rate, a best set of curves can be determined through rate-distortion optimization. One preferred algorithm for determining the curves according to the present invention, which is relatively simple, is to divide the image to be transformed into block of M×N pixels and to search for the curves that optimize a measure of rate-distortion for each of the blocks. With this algorithm, the curves within each block are parallel straight-line segments. A number of allowed orientations and their corresponding angles for the straight-line segments are predefined. The preferred algorithm determines the best of these allowed orientations for each block by performing the following steps:

(1) The image, or array of coefficients to be filtered is divided into blocks of M×N pixels.
(2) Within each block, wavelet filters are applied for every pixel along the straight lines of each of the allowed orientations, thereby decomposing the block into L and H coefficients.
(3) The resulting L and H coefficients are quantized and encoded, and a measure of rate-distortion is calculated for each of the allowed orientations.
(4) An orientation that results in a best rate-distortion is chosen for the block and straight-line segments with the chosen orientation are kept for the pixels in the block.
(5) The straight-line segments that are kept for all the blocks are connected to form a set of curves.

A simple measure of the rate-distortion can be the energy of high-pass wavelet coefficients within each block.

Another preferred algorithm for determining the curves is the detection of the edges and lines in the image. The detected edges and lines are taken as curves.

With reference to FIG. 5, processing units 705, 735, and 765 determine the image, or coefficient, values along curves. This step is required when a curve passes not exactly through a center of a pixel, but rather between several adjacent pixels; a corresponding position on the curve will be referred hereinafter as a sub-pixel position. In this case, a simplest method is to use a value of a nearest pixel as the image value at the sub-pixel position. A preferred method, however, is to interpolate the image, or coefficient, values at the sub-pixel position, which usually leads to a higher compression capability.

Figure 8A:
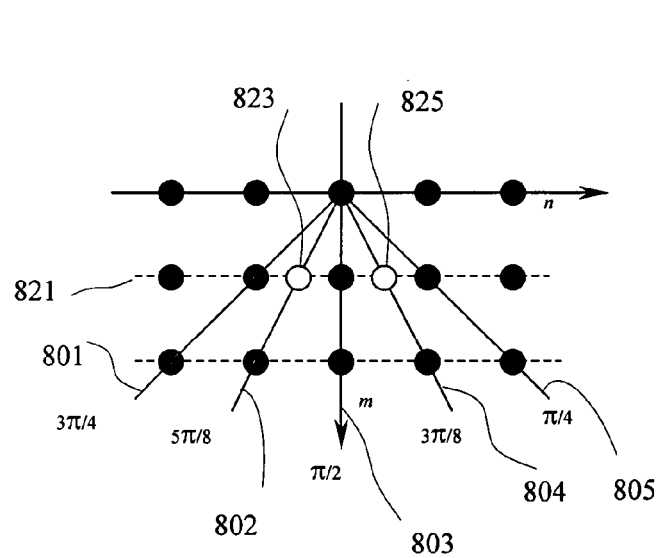
FIG. 8 is a diagram showing orientations of line segments in one block for vertical curves (a) and horizontal curves (b) according to an exemplary embodiment of the present invention.
Figure 8B:
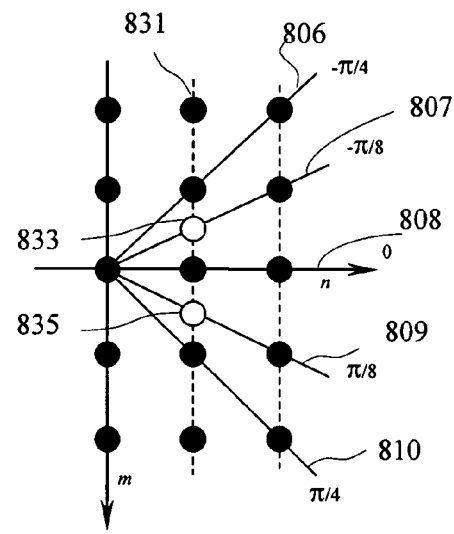

FIG. 8 illustrates an exemplary embodiment of the curve determination method according to the present invention described in an article "Curved wavelet transform and overlapped extension for image coding", in Proceedings of International Conference on Image Processing 2004, pp. 1273-1276, Singapore, Oct. 24-27, 2004, by Demin Wang, Liang Zhang, and André Vincent, who are the inventors of the present invention, which is incorporated herein by reference. In order to reduce computational and coding cost, in this exemplary embodiment the following constraints are imposed on the curves: (i) The image, or an array of wavelet coefficients, to be transformed is divided into square blocks of K×K pixels; (ii) Within each block, all curves are straight-line segments of the same orientation: for vertical curves $x_i$, the discrete orientations are $\pi/4$, $3\pi/8$, $\pi/2$, $5\pi/8$, and $3\pi/4$; they are shown in FIG. 8 by lines 801-805; for horizontal curves $y_i$, the orientations are $-\pi/4$, $-\pi/8$, 0, $\pi/8$, and $\pi/4$, as shown in FIG. 8 by lines 806-810. (iii) Sets of curves $\{y_i\}$ and $\{z_i\}$ are identical.

From FIG. 8, wherein full-pixels are shown as full circles and half-pixels as open circles, it can be seen that the line segments 804 and 802 of orientations $3\pi/8$, or $5\pi/8$, respectively, each passes between two full-pixels when they cross row 821, forming two half-pixels shown in FIG. 8 with open circles 823 and 825; similarly, the line segments 807 and 809 of orientations $-\pi/8$, $\pi/8$, each passes between two full-pixels when they cross column 831, forming two half-pixels 833 and 835. In a preferred embodiment, an image or coefficient value for each half-pixel position is obtained by a linear interpolation.

Figure 9:
FIG. 9 is an illustration of curved paths determined in image Barbara according to an embodiment of the present invention.

FIG. 9 illustrates a set of vertical curves determined using this algorithm for the image Barbara. The curves are generally parallel to the edges and lines of orientation between $\pi/4$ and $3\pi/4$ in the image.

Figure 3:
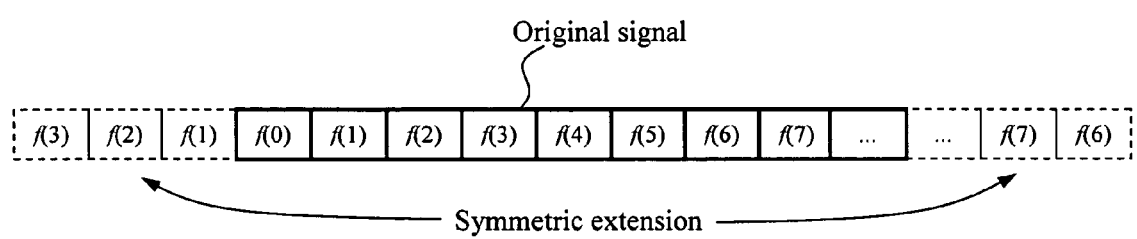
FIG. 3 is a diagram of a prior art symmetric extension of a finite length signal for application of the filter shown in FIG. 2.

The curved wavelet transform can be implemented using either a lifting filter structure or a convolution filter structure. Both structures require that the sequence of image values along each curve be extended. In FIG. 5, processing units 710, 740, and 770 extend the sequence of image, or wavelet coefficient, values along each curve. The symmetric extension shown in FIG. 3 can be used for this purpose. However, some of the curves may start and/or end in the interior of the image. Symmetric extension may introduce objectionable artifacts around the endpoints of the curves in the decoded image.

Figure 10:
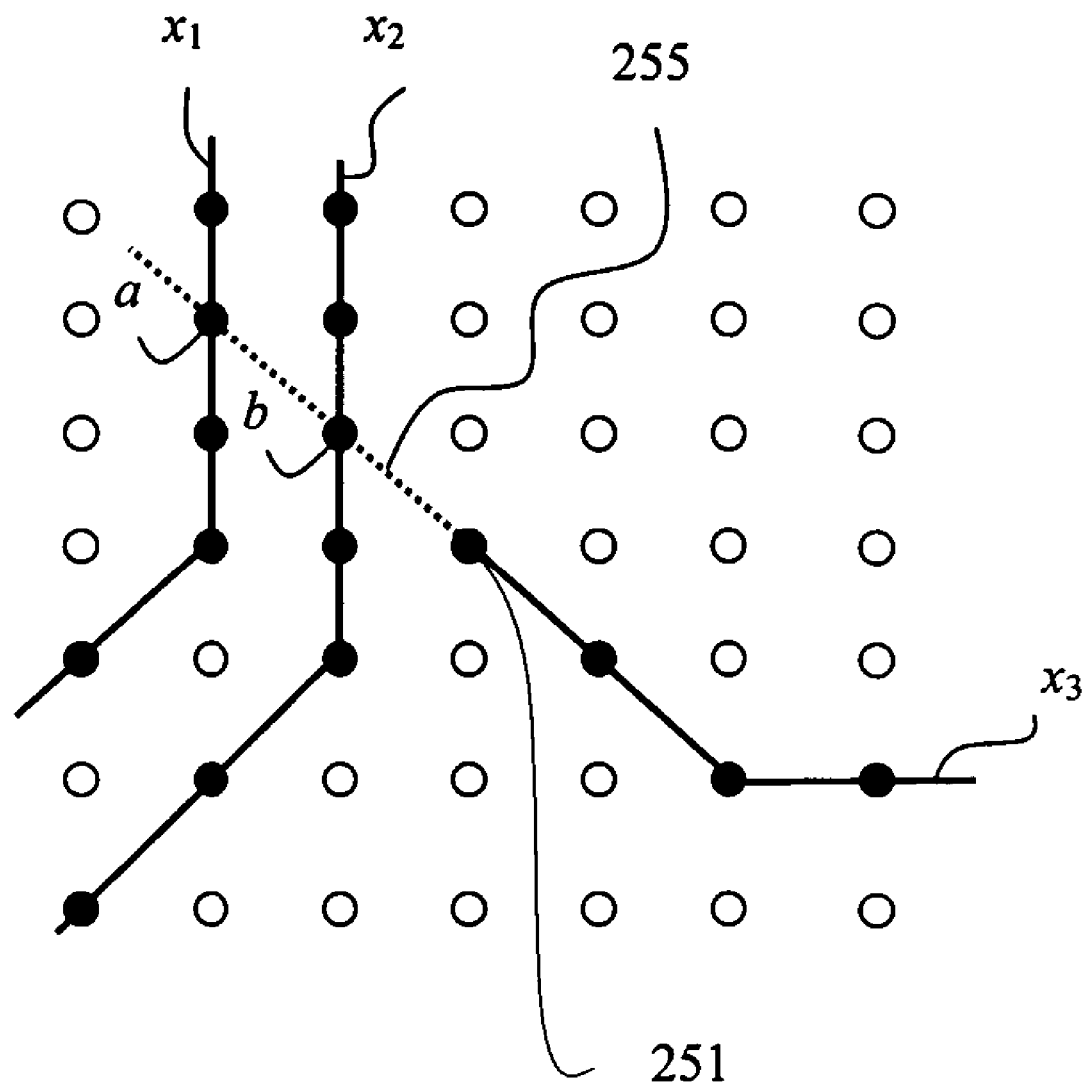
FIG. 10 is a diagram illustrating an overlapped extension for a curve having an endpoint in the interior of an image.

A preferred method of curves extension according to the present invention, which will be referred to hereinafter in this specification as overlapped extension, is shown in FIG. 10. A curve that has an endpoint in the interior of the image is extended to pixels on other curves, i.e., some image values on other curves are appended to this curve and are used to calculate wavelet coefficients along the curve. In FIG. 10, curve $x_3$ having an endpoint 251 in the interior of the image is extended with an overlap extension 255 using pixel a on curve $x_1$ and pixel b on curve $x_2$.

A preferred embodiment of the CWT, according to the present invention, is implemented using lifting filters and the overlapped extension. Lifting wavelet filters were described for example in D. S. Taubman and M. W. Marcellin, "JPEG2000: Image Compression Fundamentals, Standards and Practice", Kluwer Academic Publishers, Boston, 2002, page 281 to 289, which is incorporated herein by reference.

In another embodiment of the CWT, the forward CWT of the values along the curve shown in FIG. 10 $x_3$ is performed using conventional non-recursive convolutional wavelet filters and the overlapped extension. In the decompression apparatus 650, if the inverse CWT along the curves $x_1$ and $x_2$ shown in FIG. 10 has been done prior to that along the curve $x_3$, then the values of pixels a and b are available, and the inverse CWT along the curve $x_3$ can be performed using the recursive wavelet filters that will be described hereinafter in this specification.

Coding of the Curves

Turning back to FIGS. 4 and 5, the three sets of curves $\{x_i\}$, $\{y_i\}$, and $\{z_i\}$ for each level of the CWT have to be transmitted to the decompression apparatus 650. To this end, a curve coding unit 620 is included in the compression apparatus 600, and a curve decoding unit 660 is included in the decompression apparatus 650. The curves are represented by their orientation at each pixel, or within each block. They can be coded using entropy coding, run-length coding, or arithmetic coding, as will be clear to those skilled in the art.

A preferred embodiment of the curve coding, according to the present invention, has a one-bit header for each set of curves. If all of the curves $x_i$ of the first set are horizontal lines or if all of the curves of the second and third sets, $\{y_i\}$ and $\{z_i\}$, are vertical lines, the header bit is "0" and the straight lines are not coded. Otherwise, the header is "1" and the orientations of the curves are coded using arithmetic coding.

Adaptive Quantization of the Wavelet Coefficients

The wavelet coefficients quantization unit 625 shown in FIG. 4 can perform a uniform quantization, as used in most prior art wavelet-based image compression systems. A preferred quantization method, according to the present invention, is an adaptive quantization based on human perception and curve orientations. The curves are usually parallel to the edges and lines in the image to be compressed. The sensitivity of human perception varies with the orientation of the edges and lines. In general, human perception is more sensitive to vertical and horizontal lines than to lines of other orientations. Therefore, the step size of the preferred adaptive quantization varies with the orientations of the curves.

Adaptive Zero-Trees for Wavelet Coefficients Coding

Figure 11:
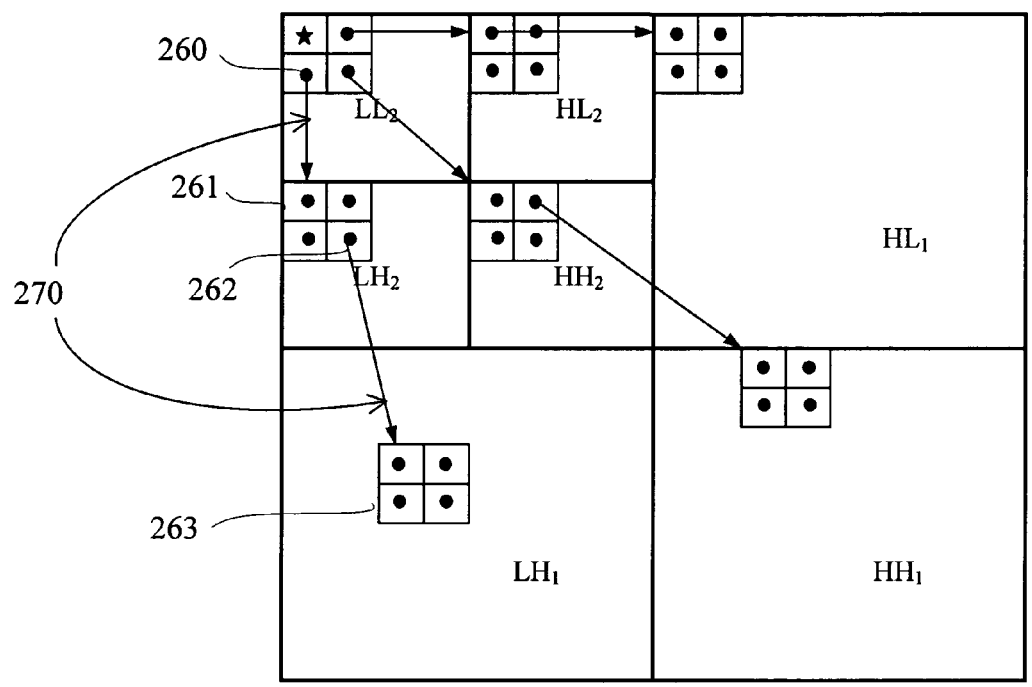
FIG. 11 is a diagram of the parent-child relation of the prior art zero-tree structures used in EZW and SPIHT.

The wavelet coefficients coding 630 in FIG. 4 can be carried out using entropy coding, arithmetic coding, EZW, SPIHT, EBCOT, or their combinations; these coding methods are known to those skilled in the art. After the quantization, a large number of wavelet coefficients become zero. The prior art EZW and SPIHT coding methods efficiently organize and represent the quantized wavelet coefficients using a tree structure of the zeros; a detailed description of the EZW method is given e.g. by Shapiro in U.S. Pat. No. 5,315,670 and a detailed description of the SPIHT method is given by Pearlman et al. in U.S. Pat. No. 5,764,807, which are incorporated herein by references. The tree structure defines a parent-child relationship between the wavelet coefficients at one level and those at the next lower level. A parent wavelet coefficient always has four children at the next lower level. In the prior art EZW and SPIHT methods, these four children are always the coefficients within a square of 2×2, as shown in FIG. 11. This fixed parent-child relationship is derived from the conventional wavelet transform along the horizontal and vertical directions. With reference to FIG. 11, arrows 270 show parent-child relationship between the coefficients. By way of example, coefficient 260 is a parent of 4 children shown by black circles in a 2×2 square 261. In turn, each of these 4 children-coefficients from the 2×2 square pattern 261 has 4 children on the next lower level; e.g. coefficient 262 has four children forming a square 2×2 pattern 263.

Figure 12:
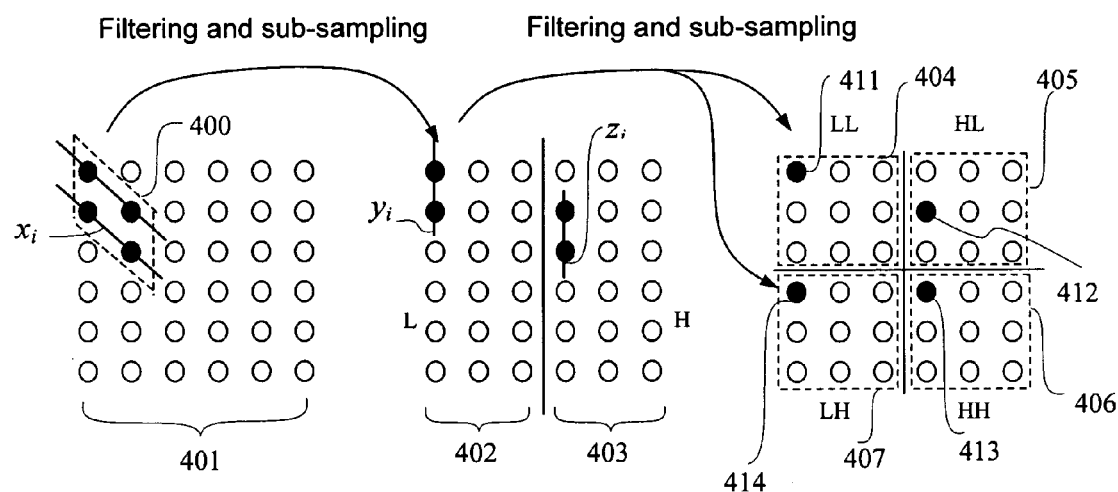
FIG. 12 is a diagram of establishing the parent-child relations according to the present invention.

The preferred embodiment of the wavelet coefficients coding, according to the present invention, exploits a zero-tree structure that is adaptive to the curves used in the CWT. This is illustrated in FIG. 12, which schematically shows an image array 401, arrays 402 and 403 of L and H coefficients resulting from the filtering and sub-sampling along the first set of curves $\{x_i\}$, and 4 arrays 404-407 resulting from the filtering and sub-sampling of the arrays of L and H coefficients 402 and 403 along the second $\{y_i\}$ and third $\{z_i\}$ sets of curves. Orientations of two curves $x_i$ that pass through four pixels shown by black circles within a parallelogram 400 are $\pi/4$, that of a curve $y_i$ passing through two resulting L coefficients shown as black circles in the array 402 is $\pi/2$, and that of the curves $z_i$ passing through two resulting H coefficients is also $\pi/2$. Resulting LL, LH, HL, and HH coefficients 411-414 at a next higher level can be considered as obtained from the sub-sampling of the four pixels within the parallelogram 400. Consequently, four children of each of these coefficients 411-414 should be within a parallelogram, rather than within a square. Therefore, the adaptive zero-tree positions of the children in an array of coefficients vary depending on the orientations of the curves along which the children are filtered. By way of example, FIG. 13 shows patterns 420, 421, 422, 423, and 424 of the children's positions for five different combinations of curve orientations. For other combinations of curve orientations, the children's patterns can be determined similarly, or approximated using one of the patterns shown in FIG. 13.

It is possible that two adjacent parents have different children patterns because their corresponding curves are different. The two patterns may be overlapped or disconnected. In this case, at least one of the children's patterns of these two parents has to be adjusted in such a way that every child has one and only one parent. This means that a coefficient is coded once and only once. With the adjustment, these two adjacent parents may have three, four, or five children.

Figure 14:
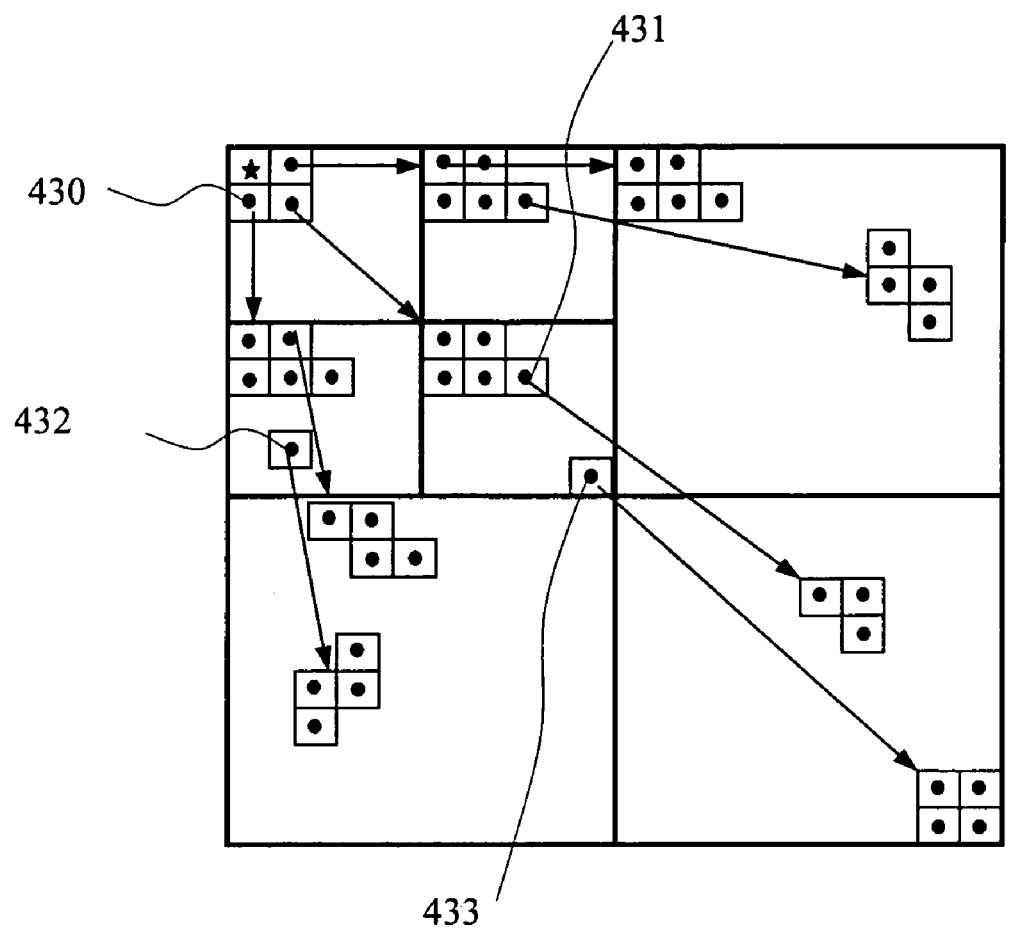
FIG. 14 is a diagram of the parent-child relation in the adaptive zero-tree structure according to the present invention.

The parent-child relationship of the adaptive zero-tree structure is illustrated in FIG. 14. By way of example, a parent 430 has 5 children and a parent 431—only 3, a parent 432 has 4 children arranged in a pattern 422 shown on FIG. 13, and a parent 433 has 4 children arranged in a pattern 420.

The adaptive zero-trees are represented using several symbols and coded using entropy coding or arithmetic coding.

Recursive Wavelet Filters

Another important feature of the method of present invention—the use of recursive wavelet filters for CWT—will now be introduced. Although the method of image transformation using CWT in accordance with the present invention can be carried out using conventional wavelet filters, such as e.g. convolutional filters or lifting filters, employing recursive wavelet filters instead according to another aspect of this invention can advantageously enable simpler hardware implementation and reduce compression-induced artifacts.

Before describing embodiments of the method and system of the present invention employing recursive filters, a brief derivation of these filters will now be given. For the sake of clarity, the description following hereinafter focuses on 1-D symmetric wavelet filters, 1-D signals, and two-band decomposition. A 1-D signal herein is a sequence of samples that can be acquired from any source. It can be a sequence of pixels along a row, a column, or a curve in an image. Also it can be a sequence of pixels from a group of images along the time axis, or along a motion trajectory, for temporal decomposition of video.

The recursive method described hereinafter in this specification can be extended to the cases of multi-dimensional filters, multi-dimensional signals, and multi-band decomposition, as well as to conventional wavelet decomposition along vertical and horizontal lines.

The conventional prior art forward and inverse wavelet transforms are performed using four FIR convolution filters or lifting filters. Let f(i) denote a signal to be transformed, $h_0(i)$ and $h_1(i)$ denote the low-pass and high-pass convolution filters for the forward transform, respectively. As described hereinbefore, an output of the low-pass filter is sub-sampled by discarding all samples with odd indices. Remaining output samples are the low-pass wavelet coefficients, or L coefficients in short. Similarly, an output of the high-pass filter is sub-sampled by discarding all samples with even indices, and remaining output samples are the high-pass wavelet coefficients, or H coefficients. Let $\{L_0, L_1, L_2, \ldots\}$ denote a sequence of the L coefficients, and $\{H_0, H_1, H_2, \ldots\}$ denote a sequence of the H coefficients. If the sequences $\{L_0, L_1, L_2, \ldots\}$ and $\{H_0, H_1, H_2, \ldots\}$ are interleaved as one sequence $\{L_0, H_0, L_1, H_1, L_2, H_2, \ldots\}$ denoted by F(i), the forward transform can be described with equation (1):

$$F(i) = \sum_{k=-Ls}^{Ls} h_{i \bmod 2}(k) f(i-k) \quad (1)$$

Where an integer Ls, which is a half-length of the convolution filters, (i mod 2) is equal to 0, if i is an even number and 1 if i is an odd number. Thus, F(i) is an L coefficient if i is an even number; otherwise, it is an H coefficient.

Figure 2:
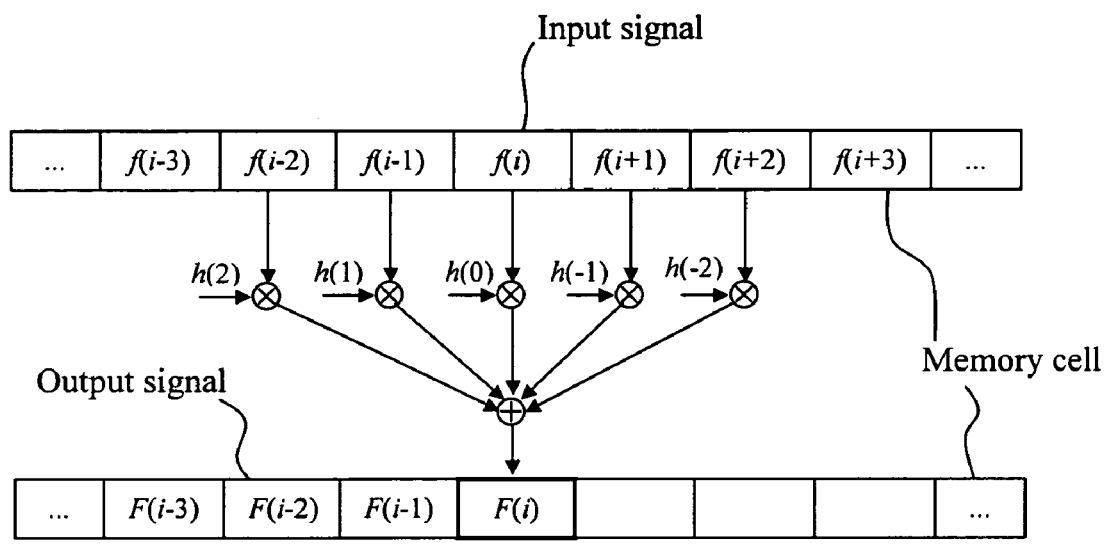
FIG. 2 is a diagram of a prior art non-recursive implementation of a symmetric FIR filter.

The inverse wavelet transform in conventional image decompression systems is typically carried out by applying a low-pass filter to the L coefficients after up-sampling by 2, applying a high-pass filter to the H coefficients after up-sampling by 2, and adding the two filtered outputs together. This process can be equivalently described by equation (2):

$$f(i) = \sum_{k=-Ls}^{Ls} g_{i \bmod 2}(k) F(i-k) \quad (2)$$

where $g_0(i)$ and $g_1(i)$ are also two FIR convolution filters. Lengths of the four filters can be different. To simplify the description herein, short filters are extended to the length (2Ls+1) of the longest filter by adding zeros. The filters described by equations (1) and (2) are implemented using the non-recursive structure of the prior-art convolution filters shown in FIG. 2.

Figure 15:
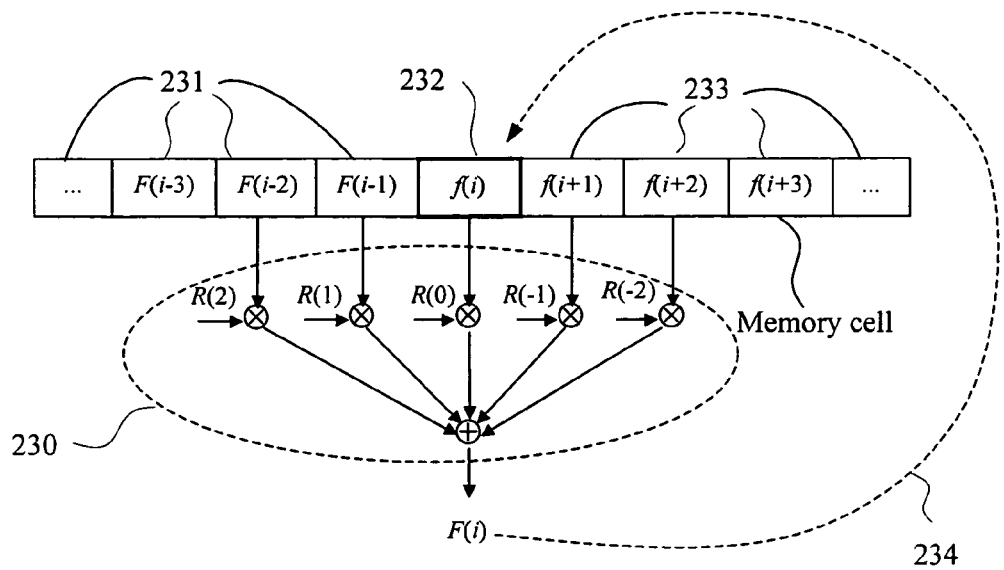
FIG. 15 is a diagram of an exemplary recursive wavelet filter according to the present invention.

Turning now to FIG. 15, a recursive wavelet filter 230 for the forward wavelet transform, according to the present invention, takes previous outputs F(k) stored in cells 231 with k<i, the current input f(i) stored in a cell 232, and "future" inputs f(k) with k>i stored in cells 233 as the inputs of the filters to calculate the current output F(i). If the signal f(i) is sufficiently long, the recursive filters for the forward wavelet transform have the following general form:

$$F(i) = \sum_{k=1}^{Ls} R_{i \bmod 2}(k) F(i-k) + \sum_{k=-Ls}^{0} R_{i \bmod 2}(k) f(i-k) \quad (3)$$

where $R_0(i)$ and $R_1(i)$ with $-Ls \leq i \leq Ls$ are the filter coefficients. Ls previously calculated wavelet coefficients and Ls "future" input samples are used as inputs to the forward recursive filter to calculate a "current" wavelet coefficient F(i). Similarly, recursive filters for the inverse transform have the following general form:

$$f(i) = \sum_{k=1}^{Ls} r_{i \bmod 2}(k) f(i-k) + \sum_{k=-Ls}^{0} r_{i \bmod 2}(k) F(i-k) \quad (4)$$

where $r_0(i)$ and $r_1(i)$ with $-Ls \leq i \leq Ls$ are the filter coefficients. In equation (4), Ls previous output samples of the filters and Ls "future" wavelet coefficients are used as inputs to the inverse recursive filter to calculate a current output f(i), or a restored image, or pixel value at a current location in the image.

The coefficients of these recursive filters can be obtained from the FIR convolution filters $h_0(i)$, $h_1(i)$, $g_0(i)$ and $g_1(i)$. For example, given $h_0(i)$ and $h_1(i)$, from (1) we have the following Ls +1 linear equations:

$$F(i) = \sum_{k=-Ls}^{Ls} h_{i \bmod 2}(k) f(i-k) \quad (5)$$

$$F(i+1) = \sum_{k=-Ls}^{Ls} h_{(i+1) \bmod 2}(k) f(i+1-k)$$

$$\ldots$$

$$F(i+Ls) = \sum_{k=-Ls}^{Ls} h_{(i+Ls) \bmod 2}(k) f(i+Ls-k)$$

After all wavelet coefficients F(k) on the left side of these equations have been moved to the right side, and all terms with f(k) with $i \leq k \leq i+Ls$ to the left side, a matrix equation (6) can be obtained from equations (5):

$$A \begin{bmatrix} f(i) \\ f(i+1) \\ \ldots \\ f(i+Ls) \end{bmatrix} = B \begin{bmatrix} f(i-Ls) \\ \ldots \\ f(i-1) \\ F(i) \\ \ldots \\ F(i+Ls) \\ f(i+Ls+1) \\ \ldots \\ f(i+2Ls) \end{bmatrix} \quad (6)$$

where A and B are two constant matrices. By solving this matrix equation, f(i) can be expressed as a linear function of the f(k) and F(k) on the right side of (6). The coefficients of this linear function are $r_0(i)$ when index i is an even number, and $r_1(i)$ when i is an odd number. Filter coefficients $R_0(i)$ and $R_1(i)$ in equation (3) can be obtained with a similar method.

By way of example, tables 1 and 2 give coefficients for the recursive filters derived from the non-recursive convolution wavelet filters that are popularly used in image analysis and compression, which are described in detail in M. Antonini, et al., "Image coding using wavelet transform," IEEE Trans. Image Processing, Vol. 1, pp. 205-220, April 1992., which is incorporated herein by reference.

TABLE 1

Coefficients of the 5/3 wavelet filters

| i | $h_0(i)$ | $h_1(i)$ | $g_0(i)$ | $g_1(i)$ | $R_0(i)$ | $R_1(i)$ | $r_0(i)$ | $r_1(i)$ |
|---|---|---|---|---|---|---|---|---|
| −2 | $h_0(2)$ | | | $g_1(2)$ | −0.125 | | | −0.125 |
| −1 | $h_0(1)$ | $h_1(1)$ | $g_0(1)$ | $g_1(1)$ | 0.250 | −0.571429 | −0.285714 | 0.500 |
| 0 | 0.750 | 1.000 | 1.000 | 0.750 | 0.875 | 1.142857 | 1.142857 | 0.875 |
| 1 | 0.250 | −0.500 | −0.250 | 0.500 | 0.250 | −0.571429 | −0.285714 | 0.500 |
| 2 | −0.125 | | | −0.125 | | 0.142857 | 0.142857 | |

TABLE 2

Coefficients of the 9/7 wavelet filters

| I | $h_0(i)$ | $h_1(i)$ | $g_0(i)$ | $g_1(i)$ | $R_0(i)$ | $R_1(i)$ | $r_0(i)$ | $r_1(i)$ |
|---|---|---|---|---|---|---|---|---|
| −4 | $h_0(4)$ | | | $g_1(4)$ | 0.037828 | | | 0.037828 |
| −3 | $h_0(3)$ | $h_1(3)$ | $g_0(3)$ | $g_1(3)$ | −0.023849 | 0.080479 | 0.038177 | −0.064539 |
| −2 | $h_0(2)$ | $h_1(2)$ | $g_0(2)$ | $g_1(2)$ | −0.141856 | −0.050739 | −0.065134 | −0.124506 |
| −1 | $h_0(1)$ | $h_1(1)$ | $g_0(1)$ | $g_1(1)$ | 0.397094 | −0.474699 | −0.423390 | 0.441776 |
| 0 | 0.852699 | 0.788485 | 0.788485 | 0.852699 | 1.048425 | 0.953812 | 0.953812 | 1.048425 |
| 1 | 0.377402 | −0.418092 | −0.377403 | 0.418092 | 0.443892 | −0.421371 | −0.378753 | 0.497686 |
| 2 | −0.110624 | −0.040690 | −0.040690 | −0.110624 | 0.068288 | 0.118755 | 0.135304 | 0.053196 |
| 3 | −0.023849 | 0.064539 | 0.023849 | −0.064539 | −0.040026 | 0.061558 | 0.022747 | −0.084376 |
| 4 | 0.037829 | | | 0.037829 | | −0.036082 | −0.036082 | |

Note that the recursive filters defined by equation (4) require Ls+1 wavelet coefficients F(i) to calculate the current output f(i). We now consider a case when the sequence of wavelet coefficients F(i) is defined within the range of $0 \leq i \leq I$ and, for $i \leq 0$ and $i \geq I$ the values f(i) are available from preceding computation steps. If the integer I is smaller than Ls+1, or when index i in equation (4) approaches I and the number of the remaining wavelet coefficients is smaller than Ls+1, the recursive filters defined by equation (4) cannot be used directly to calculate f(i). In this case, f(i) can be obtained using the following recursive filter:

$$f(i) = \sum_{k=1}^{Ls} r_{i \bmod 2}^{I-i}(k) f(i-k) + \sum_{k=-(I-i-1)}^{0} r_{i \bmod 2}^{I-i}(k) F(i-k) + \sum_{k=-Ls}^{-(I-i)} r_{i \bmod 2}^{I-i}(k) f(i-k) \quad (7)$$

for $0 < I-i \leq Ls$. The filter coefficients $r_0^{I-i}(i)$ and $r_1^{I-i}(i)$ can be obtained by a method similar to the aforedescribed method used to obtain $r_0(i)$ and $r_1(i)$ in equation (4).

An advantage of the recursive wavelet filters is that the wavelet transform implemented with recursive filters requires a small amount of memory and is easy to implement in hardware. Turning back to FIG. 15, memory cell 232 for input sample f(i) can be overwritten by the output sample F(i) as shown by an arrow 234. Therefore, the wavelet transform of an image can be realized using a single image memory. A temporal wavelet transform of a group of images can be achieved using only the memory wherein the source images are stored. This significantly simplifies the hardware implementation of the wavelet transform and benefits applications such as digital photography.

Another advantageous feature of the recursive wavelet filters according to the present invention is that a signal of a finite length to be transformed can be extended by repeating the first and last samples, referred herein as boundary samples, or boundary pixels for images, or by constant padding.

Figure 16:
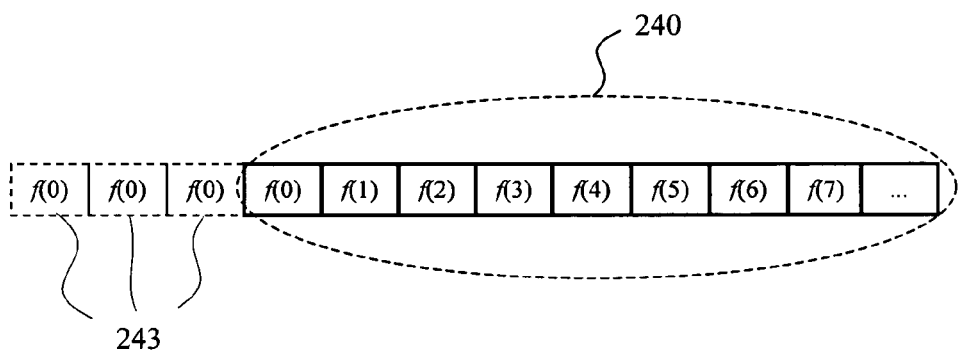
FIG. 16 is a diagram of signal extension by repeating the boundary samples.

FIG. 16 illustrates an embodiment of the image transform method of the present invention wherein the left boundary of a sequence 240 of image values f(i), referred hereinafter as a signal, along a curve is extended beyond the left boundary by repeating the first sample f(0) to create an extension 243. The extended signal comprising sequences 240 and 243 is then forward transformed using conventional non-recursive wavelet filters or lifting filters.

An inverse transform using the conventional non-recursive convolution filters cannot perfectly reconstruct the signal f(i) from the resulting wavelet coefficients F(i) because F(i) for i < 0 are unknown, as described in detail by H. J. Barnard et al. in an article "Efficient signal extension for subband/wavelet decomposition of arbitrary length signals," SPIE Vol. 2096, Visual Communications and Image Processing, 1993, pp. 966-975.

However, an inverse transform with perfect reconstruction can be achieved using the recursive inverse filters defined by equations (4) and (7).

Indeed, in a first step the boundary image value is reconstructed from first (Ls+1) wavelet coefficients using equation (8), which can be obtained from equation (4) by replacing therein all f(i) for i<0 by f(0):

$$f(0) = \frac{1}{1 - \sum_{k=1}^{Ls} r_0(k)} \sum_{k=-Ls}^{0} r_0(k) F(-k) \quad (8)$$

Then, the value f(0) is assigned to all f(i) with i<0 as illustrated in FIG. 16, and the rest of the image values f(i) for i>0 along the curve can be obtained using the recursive filter defined by equation (4).

Similarly, if f(i) is extended by padding with a known constant c, f(i) can be perfectly reconstructed from the wavelet coefficients using the recursive wavelet filters. In this case, all f(i) with i<0 in equation (4) are replaced by the constant c.

Advantageously, and contrary to the prior-art symmetric and periodic extensions, the aforedescribed method of boundary sample repetition does not introduce new frequency components to the extended signal once used together with the recursive filters of the present invention.

Figure 17:
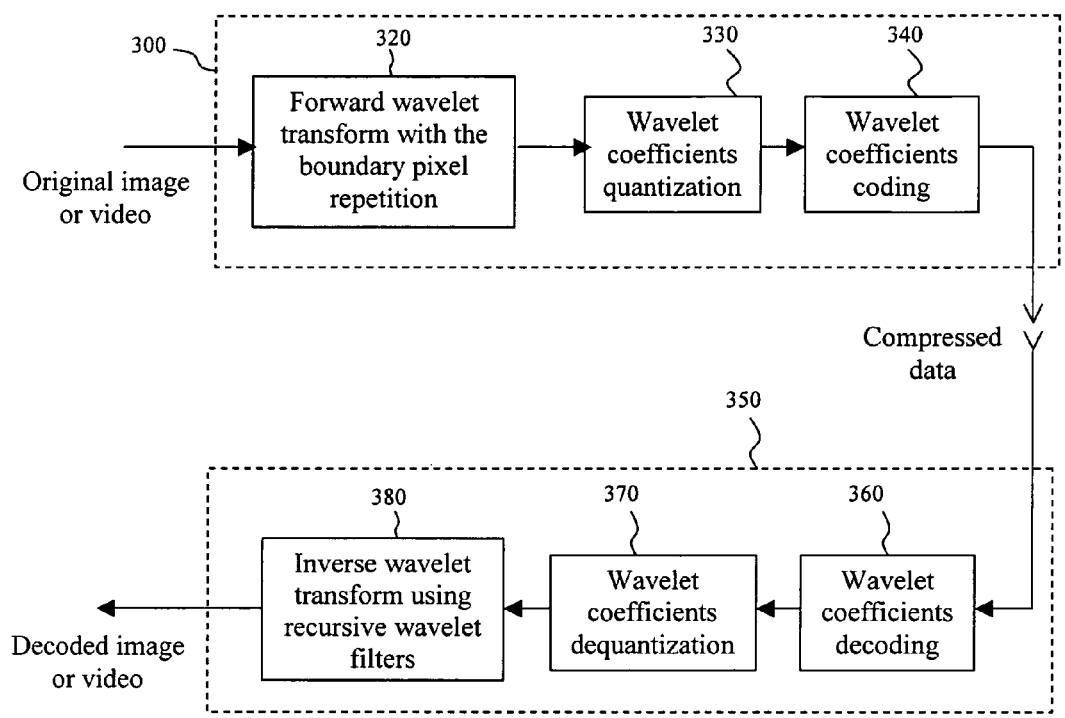
FIG. 17 is a block diagram of an image compression system using recursive wavelet filters according to the present invention.

FIG. 17 shows a block diagram of an image compression system according to an embodiment of the present invention, which employs recursive wavelet filters. As in the preceding part of the description, the term image here can mean a multi-dimensional signal, including video signal that can be represented as a 3-dimensional image. Similar to the aforedescribed system shown in FIG. 4, the system shown in FIG. 17 is formed by a compression apparatus 300 and a decompression apparatus 350. The compression apparatus 300 includes a forward wavelet transform unit 320 using the aforedescribed boundary pixel repetition for image extension, a wavelet coefficient quantization unit 330, and a wavelet coefficient coding unit 340. The decompression apparatus 350 includes a wavelet coefficient decoding unit 360, a wavelet coefficients de-quantization unit 370, and an inverse wavelet transform unit 380 using recursive wavelet filters.

For image compression, the transform performed by the forward wavelet transform unit 320 can be the curved wavelet transform, or the conventional wavelet transform. In a preferred embodiment, the forward wavelet transform unit 320 performs curved wavelet transform and includes a curve determination unit as described hereinabove in this specification in reference to FIG. 4 and 5. For video compression, the transform can be three-dimensional. The temporal wavelet transform can be performed along a time axis or along motion trajectories.

The forward wavelet transform, computed in unit 320, is performed with the boundary pixel repetition. Every sequence of pixels to be transformed is first extended by repeating the first pixel of the sequence on the left-hand side, as shown in FIG. 16, and by repeating the last pixel of the sequence on the right-hand side. Similarly to the aforedescribed embodiment of the method and system of the present invention, every extended sequence is then low-pass and high-pass filtered and is sub-sampled by 2, resulting in the L coefficients and the H coefficients, respectively. After a multiple levels of transformation, the resulting hierarchical sequence of wavelet coefficients is sent to the wavelet coefficients quantization unit 330 and the wavelet coefficients coding unit 340. The quantized wavelet coefficients can then be coded using entropy coding, arithmetic coding, EZW, SPIHT, EBCOT, or their combinations. Compressed image data with the coded coefficients are sent to the image decompression apparatus 350.

In the image decompression apparatus 350, decoding unit 360 receives the compressed image data and therefrom decodes the wavelets coefficients. In the CWT-based version of this embodiment, the curved paths are preferably decoded by the processing unit 360 prior to the decoding of the wavelet coefficients. The inverse wavelet transform is performed using the aforedescribed recursive wavelet filters by the processing unit 380, wherein the L and H coefficients resulting from forward filtering along same paths are first interleaved as described hereinbefore in conjunction with equation (1), and every interleaved sequence is then filtered using recursive wavelet filters as described hereinbefore in conjunction with equations (4)-(8), resulting in the coefficients of a lower level or, after all decomposition levels are processed, in the decoded image.

Of course numerous other embodiments may be envisioned without departing from the spirit and scope of the invention.

What is claimed is:

1. A method of image transformation comprising:
   transforming an n-dimensional image, wherein $n \geq 2$, into a wavelet-transformed image comprised of wavelet coefficients by performing one-dimensional wavelet transformations on image values along a plurality of curved paths dependent upon content of the image, using the steps of:
   a) determining the plurality of curved paths within the image;
   b) determining image values along each of the curved paths;
   d) performing the one-dimensional wavelet transformations on the image values along the curved paths using a low-pass 1-D wavelet filter and a high-pass 1-D wavelet filter along each of the curved paths to obtain a low-pass filtered image comprised of low-pass wavelet coefficients and a high-pass filtered image comprised of high-pass wavelet coefficients; and,
   e) down-sampling the low-pass and the high-pass filtered images along the first coordinate to obtain down-sampled low-pass and high-pass filtered images.

2. A method as defined in claim 1 wherein the content of the image includes at least one of: contours within the image, edges within the image, luminance, texture, and color; and wherein the wavelet transformations on image values are performed using wavelet filters having supports along the plurality of curved paths.

3. A method as defined in claim 2, wherein the n-dimensional image is representable as an n-dimensional pixel array; and wherein substantially each pixel is associated with a curved path from the plurality of the curved paths.

4. A method as defined in claim 3, wherein
   the plurality of curved paths within the image is representable by single-valued contiguous functions of a first coordinate associated with a dimension of the n-dimensional image, the plurality of curved paths being thereby associated with the first coordinate.

5. A method as defined in claim 4, wherein transforming an n-dimensional image further comprises the step of:
   c) extending curved paths from the plurality of curved paths.

6. A method as defined in claim 5, further comprising:
   f) transforming the down-sampled low-pass and high-pass filtered images along pluralities of curved paths in respective down-sampled images, said curved paths being dependent upon contents thereof and representable by single-valued contiguous functions of a second coordinate in the image associated with another dimension of the n-dimensional image.

7. A method as defined in claim 5, wherein step c) further comprises:
   for each of the curved paths from the plurality of curved paths having an end in the interior of the image, extending the curved path at the end in the interior of the image by appending thereto image values from adjacent curved paths.

8. A method as defined in claim 6, further comprising:
   g) decomposing the image into a hierarchical sequence of down-sampled low-pass and high-pass filtered images comprised of wavelet coefficients by recursively performing steps a)-f) for down-sampled low-pass filtered images at successively decreasing resolution levels.

9. A method as defined in claim 4, wherein the step of determining the plurality of curved paths comprises the steps of:
   i) dividing the image into a plurality of portions;
   ii) performing 1-D wavelet transformations of each portion along multiple pluralities of straight paths for obtaining multiple pluralities of wavelet coefficients, wherein each said plurality of straight paths is characterized by a different pre-defined orientation in the image portion;
   iii) for each image portion, selecting one of the multiple pluralities of straight paths by comparing the multiple pluralities of wavelet coefficients according to a pre-determined criterion; and
   iv) forming curved paths in the image from connecting straight paths from the selected pluralities of straight paths from different image portions.

10. A method as defined in claim 9, wherein step iii) comprises computing a measure of rate distortion for the image portion for each of the multiple pluralities of wavelet coefficients, and wherein the pre-determined criterion is to optimize the measure of rate distortion.

11. A method as defined in claim 9, wherein step iii) comprises computing a measure of high-pass wavelet coefficients for the image portion for each of the pre-defined orientations, and wherein the pre-determined criterion is a minimization of the measure of the high-pass wavelet coefficients.

12. A method of encoding an n-dimensional image comprising the steps of:
   A. transforming the n-dimensional image according to the method of image transformation as defined in claim 6 for obtaining a wavelet-transformed image comprised of wavelet coefficients obtained by wavelet filtering along curved paths;
   B. quantizing the wavelet coefficients; and
   C. coding the wavelet coefficients and their corresponding curved paths for obtaining a coded representation of the image.

13. A method of encoding an n-dimensional image as defined in claim 12, wherein step B includes adapting a quantization step size according to orientations of the curved path used to compute the wavelet coefficients.

14. A method of encoding an n-dimensional image as defined in claim 12, wherein step C is performed using zerotree structures adaptive to the curved paths.

15. A method of decoding an n-dimensional image encoded by the method of claim 12, comprising the steps of:
   D. receiving the encoded image;
   E. decoding information defining the curved paths from the received coded image representation;
   F. decoding the wavelet coefficients from the received coded image representation using the decoded information defining the curved paths;
   G. de-quantizing the wavelet coefficients using the decoded information defining the curved path; and,
   H. performing multi-level inverse wavelet transform along the curved paths.

16. An image encoding system for encoding and compressing images into encoded image data, the images represented using arrays of pixels, the image encoding system comprising:
   a curve determination unit for determining a plurality of curved paths in an image wherein substantially each pixel is associated with a curved path from the plurality of curved paths;
   a curved wavelet transform unit for performing wavelet transformations of image values along the plurality of curved paths and for outputting wavelet transformed images represented by wavelet coefficients;
   a curve coding unit for coding the plurality of curved paths;
   a wavelet coefficient quantization unit for performing curved path adaptive quantization of the wavelet coefficients; and,
   a wavelet coefficient coding unit for performing curved path adaptive coding of the wavelet coefficients.

17. An image decoding system for decoding and restoration of images encoded by an image encoding system according to claim 16, the image decoding system comprising:
   a curve decoding unit for decoding information defining the curved paths;
   a wavelet coefficient decoding unit responsive to the decoded information defining the curved paths for adaptively decoding wavelet coefficients for the image;
   a wavelet coefficient de-quantization unit for de-quantization of the decoded wavelet coefficients of the image; and,
   an inverse curved wavelet transform unit for performing inverse wavelet transformations for restoring image values along the curved paths in the image.

18. A method as defined in claim 5, wherein step c) is performed by repeating at least one of a first and a last image value in the sequence of image values along the curved path at the beginning and the end thereof, respectively.

19. A method of encoding an n-dimensional image comprising the steps of:
   K. transforming the n-dimensional image according to the method of image transformation as defined in claim 18 for obtaining a wavelet-transformed image comprised of wavelet coefficients obtained by wavelet filtering along curved paths;
   L. quantizing the wavelet coefficients; and
   M. coding the wavelet coefficients and their corresponding curved paths for obtaining a coded representation of the image.

20. A method of decoding an n-dimensional image encoded by the method of claim 19, comprising the steps of:
   N. receiving the encoded image representation;
   O. decoding information defining the curved paths from the received coded image representation;
   P. decoding the wavelet coefficients from the received coded image representation using the decoded information defining the curved paths;
   Q. de-quantizing the wavelet coefficients using the decoded information defining the curved path; and,
   R. performing multi-level inverse wavelet transform along the curved paths using recursive wavelet filters.

21. A method of decoding according to claim 20, wherein step R comprises, for each curved path, the steps of:
   computing a first image value $f(0)$ along the curved path from a set of $(L+1)$ first wavelet coefficients $F(k)$, $k=0, \ldots L$, along the curved path, wherein integer $L$ is a half-length of the recursive filter; and
   sequentially computing image values $f(i)$, wherein integer $i=1,2,\ldots$ is an index of image values and respective wavelet coefficients along the curved path, in a direction of increasing $i$ along the curved path from $L$ preceding image values $f(i-1), \ldots, f(i-L)$ and $(L+1)$ following wavelet coefficients, wherein $f(i)=f(0)$ for $i<0$.

* * * * *